United States Patent [19]

Orsini et al.

[11] 3,874,904

[45] Apr. 1, 1975

[54] METHOD OF POLYURETHANE COATING USING A ONE-COMPONENT POLYURETHANE

[75] Inventors: Leon Orsini; Roger Laurent; Denis Dessevre, all of Grenoble, France

[73] Assignee: P.B.U. (Progil-Bayer-Ugine), Pont-de-Claix, France

[22] Filed: Oct. 6, 1972

[21] Appl. No.: 295,556

Related U.S. Application Data

[60] Division of Ser. No. 102,559, Dec. 29, 1970, abandoned, which is a continuation-in-part of Ser. No. 727,079, May 6, 1968, abandoned.

[30] Foreign Application Priority Data

May 26, 1967 France .......................... 67.108676

[52] U.S. Cl............ 117/72, 117/123 D, 117/132 B, 117/136, 117/161 KP, 260/37 N
[51] Int. Cl............................................. B32b 27/40

[58] Field of Search............ 117/161 KP, 123 D, 72; 260/37 N

[56] References Cited
UNITED STATES PATENTS

| | | | |
|---|---|---|---|
| 2,902,388 | 9/1959 | Szukiewicz..................... | 117/161 KP |
| 3,136,732 | 6/1964 | Kaestner et al................... | 260/37 N |
| 3,272,098 | 7/1966 | Buchholtz et al......... | 117/161 KP X |
| 3,401,050 | 9/1968 | Scheibelhoffer et al.......... | 260/37 N |
| 3,534,000 | 10/1970 | Blanc et al........................ | 260/37 N |
| 3,549,404 | 12/1970 | Liberti et al...................... | 117/72 X |

*Primary Examiner*—Ralph Husack
*Attorney, Agent, or Firm*—Browdy & Neimark

[57] ABSTRACT

Relates to coatings of polyurethane having free isocyanate groups to which have been added pulverulent fillers having a grain size of between 0.05 – 3 mm diameter which can be as thick as 12–15 mm and still free from all surface defects.

2 Claims, No Drawings

METHOD OF POLYURETHANE COATING USING A ONE-COMPONENT POLYURETHANE

This is a division, of application Ser. No. 102,559, filed Dec. 29, 1970, which in turn is a continuation-in-part of Ser. No. 727,079, filed May 6, 1968, both abandoned.

The present invention relates to polyurethane coating compositions having free isocyanate groups which are especially adapted to coating applications in thick layers and which harden without swelling or other surface irregularities. The coatings of this invention can be utilized as coatings in the building industry, protective coatings for steel and concrete, road coatings, re-rigging mortars in ship-building, etc.

Polyurethane one-component systems, which contain free isocyanate groups and which harden under the influence of moisture, have attained increasing success in the field of thin coatings and varnishes. Their use is easier than the two-component polyurethane systems, and accordingly can be applied by relatively unskilled labor. They have excellent adherence to numerous bases such as wood, concrete, steel and may be used without damage even on wet surfaces.

However, these polymers have a serious disadvantage. When hardening by the reaction of isocyanate groups with air and moisture, carbon dioxide is formed, and the greater the NCO/OH ratio, the greater is the liberation of carbon dioxide. This gas may readily escape from the polymer coating when it is very thin. However, if the coating is relatively thick, since the hardening occurs first at the surface, the gas forming later on below the surface cannot escape and gives rise to the formation of wellings and surface defects and thereby provides an unsatisfactory coating.

Due to this deficiency of polyurethanes having free isocyanate groups such polymers have not been used in applications requiring a relatively high coating thickness. Their utility has therefore been limited to thin coatings or to other, non-coating applications such as seals.

A way has now been found to use the advantages of polyurethanes having free isocyanate groups and to use these polymers in the fabrication of coatings adapted to be applied in a single layer several millimeters thick.

The present invention relates to new coatings comprising polyurethane one-component systems, having free NCO groups and pulverulent fillers of known type, characterized by a determined granulometry. It has thus been found that if fillers are added to these polymers, which fillers have a grain size of between 0.05 – 3 mm of diameter, compositions are obtained which may be applied as coatings in thicknesses up to 12–15 mm and yield coatings free from all the surface defects.

The one component polyurethanes which may be used in the present compositions are products of the classical type, prepared by reacting polymers with hydroxyl end-groups and organic polyisocyanates, in such proportions so that the ratio of NCO/OH is chosen between 2.5 and 10 — at NCO/OH ratios lower than 2.5, the effects of carbon dioxide generation in the absence of the fillers is not so severe.

The polyhydroxyl compounds usable as raw materials in the manufacture of polyurethanes may be polyesters or polyethers, possibly containing phosphorus or chlorine atoms, and having a variable molecular weight, preferably of between 500 and 10,000. They are prepared according to known processes. The polyesters are obtained, for example, by reacting an organic diacid, such as adipic, or phthalic acid and a polyalcohol in light excess, such as butane-diol or ethylene glycol, the water formed by esterification being removed from the reaction mass. The polyethers are formed, for example, by condensing an alkylene oxide such as ethylene or propene oxide, on an hydroxylated initiator such as propyleneglycol, glycerol, an aminoalcohol, etc. Linear polymers are generally used. However it is possible to use a small proportion of branched polyethers or polyesters, for example 5 to 10 percent of the weight of the linear polymer.

For the preparation of the polyurethanes constituting the first element of the compositions according to the invention, it is possible to react with the precited polymers having hydroxyl groups, any polyisocyanate generally used in the polyurethane industry. But it is better, for safety reasons in view of the further coating applications, to use products which do not give off toxic vapors. Thus, it is advantageous to use: diphenylmethane diisocyanate, the mixture of this product and its upper homologs which is known under the name of Desmodur VL, the reaction product of hexamethylene diisocyanate and water known under the name of Desmodur N, a condensation product of three moles of toluylene diisocyanate and one mole of trimethylolpropane, a polyisocyanate having an isocyanurate structure such as Desmodur IL or polyphenyl polymethylene polyisocyanate. Those reagents are used without a solvent if the isocyanate is in the liquid state, or in solution in an inert organic solvent such as acetone, trichloroethylene, methyl-ethylketone, ethyl acetate, etc., if the isocyanate is of a very viscous or solid nature.

Polyurethanes may also be prepared by introducing such a solvent into the reaction medium.

The second constituent element of the compositions according to the present invention are the fillers. These may be chosen, according to their nature, among the products generally used with polyurethanes, as for example, clay, silicas, quartz, mica, sand, corundum and silicon carbide. They may also be formed of waste plastic materials and elastomers, such as polyamide or rubber powders. The critical and determining factor for the composition according to the present invention is the granulometry of the fillers introduced in the polymers. It has been found that the fillers must not be in a finely divided state, but must on the contrary have a relatively high grain size. Because of that, the mixture of polymers and fillers has a permeable texture, and at the time of polymer hardening under the moisture effect, the diffusion of carbon dioxide through the mass — as well as of possibly present solvent vapors — is made easier and quickened and the gas may escape without giving rise to surface irregularities, such as swellings. However the fillers must not be too coarse so that the final coatings are sufficiently dense. Particle diameters ranging approximately between 0.05 and 3 mm., and preferably 0.1 and 1 mm give excellent results.

The respective ratios of urethane polymer and fillers may vary in large enough limits and depend upon the application provided for the final coatings. In a general way, it is advantageous, although not obligatory, to use at least 1 part by weight of filler per part of dry polymer. However the ratio of filler may be much greater and reach 2 to 40 parts per part of polyurethane, for example, when the final coating is intended to be used as mortar, without having a critical upper limit.

The compositions according to the invention may contain, in addition to polymer and fillers and possibly to solvent present in the polyurethane, various additives such as hardening accelerators for the polymer, like tertiary amines, some organo-metal derivatives, especially tin or organic acid metal salts, fungicides, bactericides, etc. Moreover, it is possible to add pigments such as iron or chromium oxide, or lead chromate, which impart a color to the final product, the preferred ratios varying between 1 and 5 percent by weight. Also the compositions may contain fireproofing agents.

It is known that it is common to introduce in the compositions containing flame-sensitive polymers, additives having a fireproofing action such as metal oxides, organo-phosphorus derivatives, chlorinated or brominated organic compounds, alone or in combination. It has been found that, among the known fireproofing agents, the combination of antimony oxide and decachlorodiphenyl is particularly suitable for the coatings according to the invention. Tests have shown that, when this combination is added to the coatings, they are wholly fireproof, and moreover do not lose their shape in fire. Thus, if a steel sheet coated with a coating according to the invention, containing antimony oxide and decachlorodiphenyl is contacted directly with a flame, it has been found that coating does not inflame and does not undergo any deformation. Comparative tests made by substituting other usual fireproofing agents — such as for example mixtures of antimony oxide and chlorinated paraffins or trichloroethylphosphate — for the above combination have not given a complete absence of coating deformation.

The generally used quantity of decachlorodiphenyl and antimony oxide is from about 0.3 to 0.8 part by weight of each of these compounds per part of polyurethane (calculated in dry extract).

The method of manufacturing the compositions according to the invention, consists of a simple mixing of the constituents. It is possible to proceed according to the methods generally used in masonry, that is in using a trowel or a concrete-mixer. Preferably the mixture is made immediately before using. Then it is not necessary to dry the fillers previously, since the moisture is necessary to the hardening of the polymer included in the coatings. This peculiar feature, which constitutes also a characteristic of the invention makes the utilization very much easier.

The compositions according to the invention may be applied on several types of surfaces as for example wood, steel, concrete, asbestos and cement. Although it is not obligatory to submit the surfaces to a previous treatment, it may be interesting, in some cases, to provide the surface to be coated with a layer of the same polyurethane as used in the invention but without fillers, before applying the final coating. When operating in this way, it is possible to use, as a primary coating, 50 to 400 g/m$^2$ of solutions, in a volatile organic solvent, such as for example acetone or trichloethylene, containing 30 to 80 percent of dry extract.

As indicated above, the compositions of this invention permit obtaining, in a single operation, coatings of several millimeters thickness, which harden wholly in some hours without giving any swelling or surface defects. It is possible to apply coatings of the horizontal, inclined or vertical surfaces; in this last case the coatings are applied in successive layers which it is possible to apply at intervals from only 15 to 45 minutes, the hardening of the layers in position being sufficiently hard at the end of this time.

The fields of utilization of the compositions according to the invention are very numerous and will be quickly obvious to the man skilled in the art. For example, in a non-limitative way, they may be used as ground and building coatings, as layers on steel tank insides or of concrete for protecting these materials against water and chemical action. They may be used as decorative coatings for basements in the form of pigmented coatings. They may also be applied as protective layers on bitumen or tars in road building, by compacting them with a cylinder. Another type of utilization consists of the making of molded articles such as flag-stones, paving-stones, briquettes, etc.

The compositions of the present invention may also be used for the manufacture of foundry moldings. It is interesting to note that, in this utilization, the calcination residues of the polyurethane do not hinder at all the further painting of the cast pieces obtained in this way. Also, the fireproof compositions are especially interesting as building re-rigging mortars, and especially shipbuilding.

The examples hereinafter, given in a non-limitative way, show how the present invention may be used.

EXAMPLE 1

A polyurethane is prepared by mixing at room temperature one part by weight of technical diphenylmethane diisocyanate (Desmodur VL) and one part by weight of a polypropylene glycol having a molecular weight of 2,000 containing about 1.7 percent of hydroxyl groups. The mixture is cured for 24 hours at room temperature, under gentle stirring and with moisture being excluded. It is possible to heat with moisture excluded and with stirring for 1 to 2 hours at 50°–60°C. The obtained polyurethane contains about 12.5 percent of free NCO groups.

10 parts by weight of this polymer are mixed with 90 parts by weight of sand or corundum having a granulometry of 0.6 to 1 mm. About 2 percent of lead chromate are incorporated in the mass to obtain a yellow color and the coating is applied with a trowel on concrete having received previously, 1 or 2 hours before, a layer of 100 to 300 g per m$^2$ of a solution of the polymer described hereinabove, diluted at 50 percent with acetone.

This coating may also be applied directly on a typical road bituminous coating, without any previous application of polymer solution. The NCO/OH ratio is 7.

The mixture which has the aspect of a mortar is applied easily 5 mm thick; it hardens in about 10 hours giving a very regular surface.

EXAMPLE 2

A polyurethane is prepared by mixing, at room temperature, 100 parts by weight of the reaction product of 3 molecules of toluylene diisocyanate and one molecule of trimethylol propane, in a 75 percent solution in ethyl acetate and 50 parts by weight of a polyester obtained from adipic acid and diethylene glycol, containing about 1.3 percent of hydroxyl groups. About 50 parts by weight of ethyl acetate are added to make easier the preparation of the mixture. The whole is brought to 60°C under slight stirring and without moisture for 2 hours; then it is cooled still sheltered from moisture.

To one part by weight of the polymer solution described hereinabove, there is added 6 parts by weight of fine sand containing grains having a diameter from 0.4 to 0.8 mm. The mixture is prepared as for a mortar and applied with a trowel on a steel surface having received 1 or 2 hours earlier, a layer of the polymer solution described hereinabove, to make a sticking surface for the mortar. This one is applied in a thickness of 3 to 4 mm and polished with a trowel. After about 15 hours a hard coating having a nice surface aspect is obtained. The NCO/OH ratio is 9.

EXAMPLE 3

The polymer obtained in Example 1 is diluted with an equal weight of trichlorothylene. To one part by weight of this solution there is incorporated 6 parts by weight of fine sand containing grains having a 0.4 to 0.8 mm diameter; 0.3 parts by weight of decachlorodiphenyl and 0.3 parts by weight of antimony oxide are added. The constituents are mixed either with a trowel or in a concrete mixer.

On a steel sheet plate 3 mm thick there is first applied a layer of solution at 50 percent of the polyurethane of Example 1 in trichlorethylene, at the rate of 300 g/m². After a time which may vary between 15 minutes and 2 hours, a layer 5 to 6 mm thick of the precited mortar is applied with a trowel. Mortar is polished with the trowel. About 15 hours later, a coherent, hard and smooth coating is obtained. It is let harden for about a week and the inflammability test is applied which is described in the technical schedule No. IV of the Arrêté de la Marine Marchande, dated August 28, 1959, (appeared in the Journal Officiel of September 19, 1959).

According to this test, the metallic plate is disposed horizontally, then a heat source of about 550°C is drawn near the non-coated face, and the modifications which appear on the mortar applied on the opposed face are examined. During the test time, a small flame is drawn near the mortar surface, to try and inflame the vapors able to escape. A little evolution of white smoke is noted which did not inflame. When this evolution stops, no mortar modification takes place any more, even in extending the contact time of the heat source with the non-protected face of the test piece. The test is stopped at the end of 30 minutes. It is noted that the mortar is still coherent and non-deformed.

The obtained results show that the coatings according to the invention containing associations of decachlorodiphenyl and antimony oxide may be considered as non-inflammable according to the prescriptions of the precited standard, while compositions containing chlorinated paraffins and/or trichloroethylphosphate — examined under the same conditions as previously - inflame or give off combustible vapors which go on burning even after the removal of the pilot-flame.

EXAMPLE 4

In 120 ml of the polymer described in Example 1, 30 g. of green chromium oxide are incorporated. 1 liter of fine sand having a granulometry comprised between 0.3 and 0.8 mm is mixed with the polymer.

The obtained mortar is cast in a wood mold the walls of which are coated with wax to make them anti-adherent. It is slightly compressed and after 2 to 4 hours, while the mortar is still soft, it is compacted under a press (pressure 20 kg/cm²). After about 15 hours it is taken out of the mold; a hard and rigid flagstone is obtained having mold dimensions, for example 150 × 150 × 20 mm. Such flagstones may be used for ground coatings.

EXAMPLE 5

On a road-coating made of bitumen or tar and gravel, a layer of the following mixture is applied:

| | |
|---|---|
| polymer prepared in Example 1 | 100 parts (weight) |
| triethanolamine | 10 parts |

15 to 30 minutes later the same mortar as the one described in Example 4 is spread. Two or 3 hours later it is compacted with a cylinder. About 15 hours later a smooth coating adhering strongly to the support coating is obtained.

EXAMPLE 6

1 liter of sand having a granulometry comprised between 0.1 and 0.4 mm is mixed with 40 ml of the polymer described in Example 1 containing 1 g of zinc octoate having 0.8 percent of zinc.

A hollow dismountable mold of 8 cm diameter and 20 cm depth is filled with this mortar. The mold is placed in an oven at 220°C for 5 min. and it is demolded. A block is obtained, usable to make molds in foundry.

It will be obvious to those skilled in the art that various changes may be made without departing from the scope of the invention and the invention is not to be considered lilimited to what is described in the specification.

What is claimed is:

1. A method of coating a surface with a polyurethane coating which comprises applying onto said surface a prime coat of a solution of polyurethane in a volatile organic solvent, said solution containing 30–80 percent of dry extract, said solution being applied at the rate of 50 – 400 g/m²; after a period of at least 15 minutes applying thereon a top coating of 3–15 mm thickness of a non-component polyurethane having free isocyanate groups and having a ratio of NCO/OH in the range of 2.5 – 10 and including 2 – 40 parts by weight of dry polyurethane of pulverulent filler having a grain size of 0.05–3mm diameter; thereafter allowing said one-component polyurethane to cure in the presence of moisture.

2. A method of coating a large surface with a one component polyurethane system, comprising:
applying onto said surface in a thickness of 3–15 mm a composition consisting essentially of a one component polyurethane having free isocyanate groups which harden under the influence of moisture prepared from a linear polyether or polyester containing hydroxyl groups and an organic polyisocyanate, said system having a ratio NCO/OH in the range of 2.5 – 10, the remaining OH groups necessary to effect polyurethane curing being provided by moisture, and 2–40 parts by weight per part polyurethane of a filler having a large grain diameter between 0.05 and 3 mm.

* * * * *

UNITED STATES PATENT OFFICE
CERTIFICATE OF CORRECTION

PATENT NO. : 3,874,904
DATED : April 1, 1975
INVENTOR(S) : ORSINI et al

It is certified that error appears in the above-identified patent and that said Letters Patent are hereby corrected as shown below:

Column 6, line 35, "lilimited" should read --limited--

Column 6, line 45, "non-component" should read --one-component--

Signed and Sealed this twenty-ninth Day of July 1975

[SEAL]

Attest:

RUTH C. MASON
Attesting Officer

C. MARSHALL DANN
Commissioner of Patents and Trademarks